United States Patent

[11] 3,559,931

| [72] | Inventor | Russell A. Pohl |
| | | Sioux Falls, S. Dak. |
| [21] | Appl. No. | 746,806 |
| [22] | Filed | July 23, 1968 |
| [45] | Patented | Feb. 2, 1971 |
| [73] | Assignee | Raven Industries, Inc. |
| | | S. Dak. |
| | | a corporation of South Dakota |

[54] STABILITY DEVICE FOR PARACHUTES
13 Claims, 5 Drawing Figs.

[52] U.S. Cl. .................................................. 244/145
[51] Int. Cl. .................................................. B64d 17/14
[50] Field of Search .......................................... 244/145, 142

[56] References Cited
UNITED STATES PATENTS

| 1,737,913 | 12/1929 | Broadwick | 244/145 |
| 2,472,601 | 6/1949 | Mallory | 244/145 |
| 2,759,694 | 8/1956 | Lemoigne | 244/145 |
| 3,331,573 | 7/1967 | Winker et al. | 244/145 |

FOREIGN PATENTS

| 253,070 | 7/1964 | Australia | 244/145 |

OTHER REFERENCES

Heinrich, Abstract of Serial No. 783,883, Filed Nov. 4, 1947, published in 649 O.G. 690, on August 21, 1951 (Class 244— 145).

*Primary Examiner*—Milton Buchler
*Assistant Examiner*—James E. Pittenger
*Attorney*—Hill, Sherman, Meroni, Gross & Simpson ABSTRACT: An improved parachute which has a burble fence attached to the outer portion of the canopy in order to cause separation of the air flowing over the outer surface of the canopy at the same location at all times. This eliminates oscillations which are caused with conventional parachutes due to the nonuniform separation of the smooth flow of air over the canopy.

PATENTED FEB 2 1971 3,559,931

INVENTOR.
RUSSELL A. POHL

BY _____ ATTORNEYS

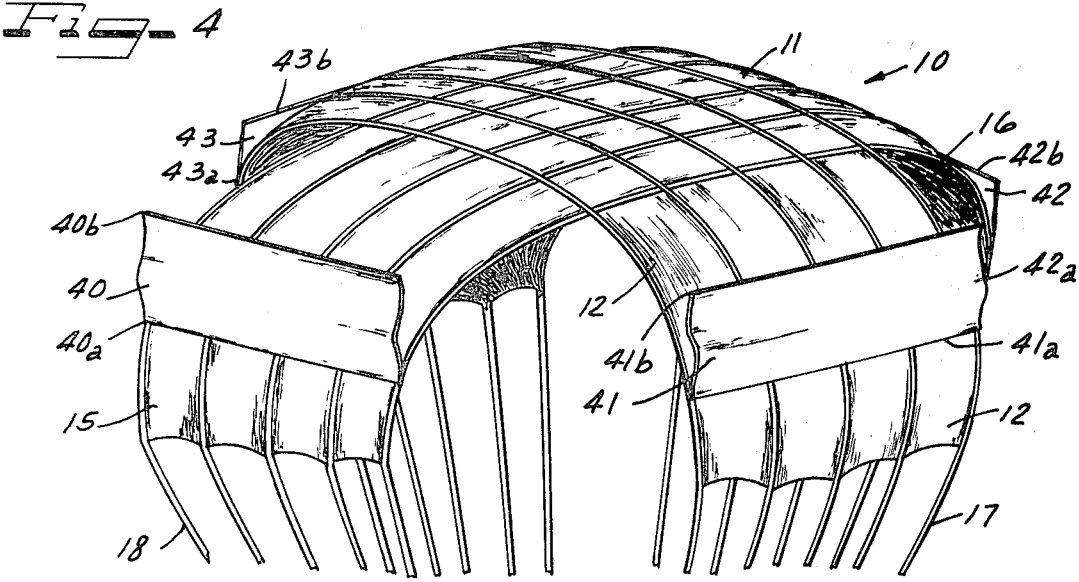
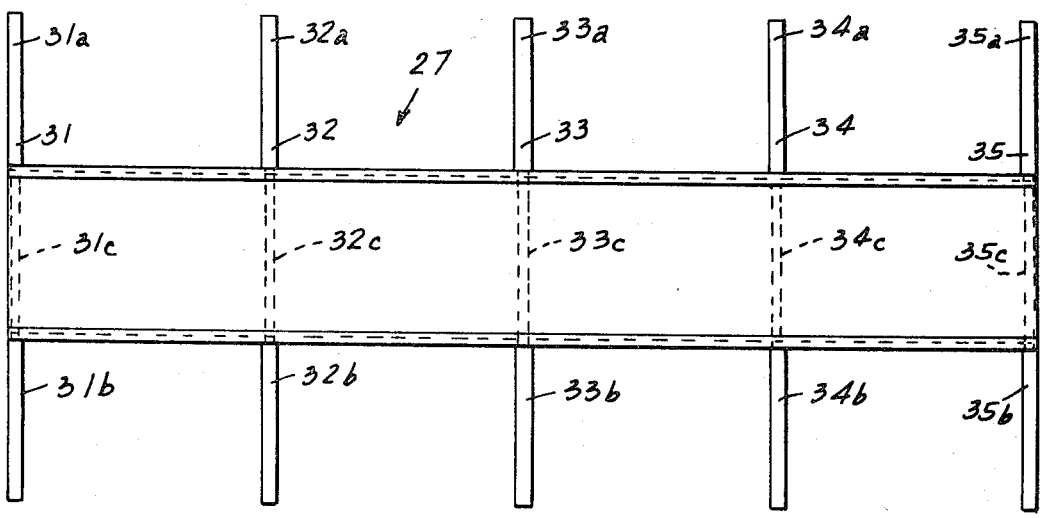
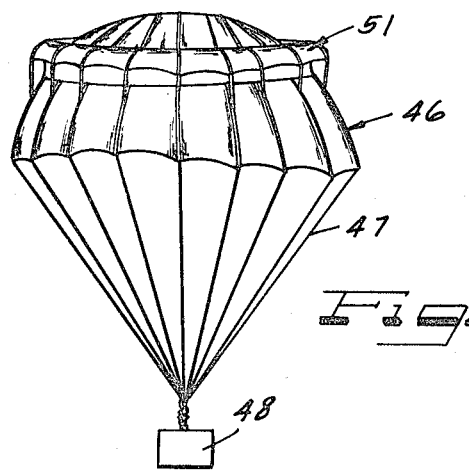

STABILITY DEVICE FOR PARACHUTES

BACKGROUND OF THE INVENTION

1. Field of the Invention

This invention relates in general to parachutes of an improved type.

2. Description of the Prior Art

Conventional parachutes have canopies of generally hemispherical shape over which air flows as the parachute descends in use. The outer portions of the canopy extend substantially vertically and the air flow is smooth along this portion of the canopy. The canopy gets smaller and smaller toward the top and the air flowing up along the surface of the canopy separates from the canopy between the portion of the canopy which is vertical and the portion at the top which is horizontal in use. Since the canopy is a flexible member its shape varies from instant to instant due to gusts and unbalanced forces and this results in the air flow over and around the parachute canopy not being uniform and the air separates from the canopy at various places as it flows up over the canopy. This causes the parachute to oscillate and an unstable condition exists.

SUMMARY OF THE INVENTION

The present invention comprises an improved parachute which has a canopy to which is attached a burble fence or trip fence on the outer portion of the canopy between the substantially vertical portion of the canopy when inflated, and a substantially horizontal portion of the canopy when inflated. The burble fence extends substantially vertically from the canopy at its attachment point and assures separation of the air flow from the canopy at the same point around the surface at all times. This results in a smooth flow of air over the canopy and eliminates oscillations and unbalancing of forces such as occur in conventional parachutes.

A first embodiment of the burble fence comprises a generally rectangular sheet of fabric with one edge attached about the periphery of the parachute at a point where it is desired that the air separate from the canopy and which has a plurality of strips attached to its outer edge to cause it to curve outwardly and downwardly toward the canopy and with the strips being attached to the canopy below the attachment point of the other edge of the rectangular sheet. A second modification of the burble fence comprises a rectangular sheet of fabric attached about the periphery of the outer surface of the parachute canopy and which extends substantially vertical when the parachute is inflated due to the air flow over the canopy.

Other objects, features and advantages of the present invention will be readily apparent from the following detailed description of certain preferred embodiments thereof taken in conjunction with the accompanying drawings

BRIEF DESCRIPTION OF THE DRAWINGS

FIG. 3 illustrates in plan view the burble fence of this invention before it is attached to the parachute canopy;

FIG. 4 illustrates a modification of the invention; and

FIG. 5 illustrates the burble fence of this invention attached to a hemispherical-shaped parachute.

DESCRIPTION OF THE PREFERRED EMBODIMENTS

As a parachute descends air flows generally smoothly along its substantially vertical sides and then separates from the parachute canopy as the parachute canopy tends to become horizontal. However, the flow of air over and around most parachute canopies is not uniform and the wake or flow pattern behind the canopy is nonuniform. This is because the air flow does not separate from the canopy at the same place at all times which gives rise to oscillations in the parachute. The present invention assures that the smooth flow of air over the canopy separates at a definite location in that a burble fence or trip fence is attached to the surface of the canopy which assures positive separation. This eliminates oscillations and stabilizes the descent of the parachute.

The trip fence may be fabricated in a number of ways. For example, in a first embodiment, a generally rectangular strip of parachute fabric may be attached to the canopy about its curved surface and with the upper edge attached by straps or shroud lines so that the strip is curved to form a discontinuity in the surface of the canopy to definitely interrupt the air flow at the burble fence.

A second modification comprises attaching a strip of parachute fabric to the canopy of the parachute and allowing it to extend loosely straight upwardly due to the air currents and thus form a separation barrier for the smooth flow of air.

Figure 1:
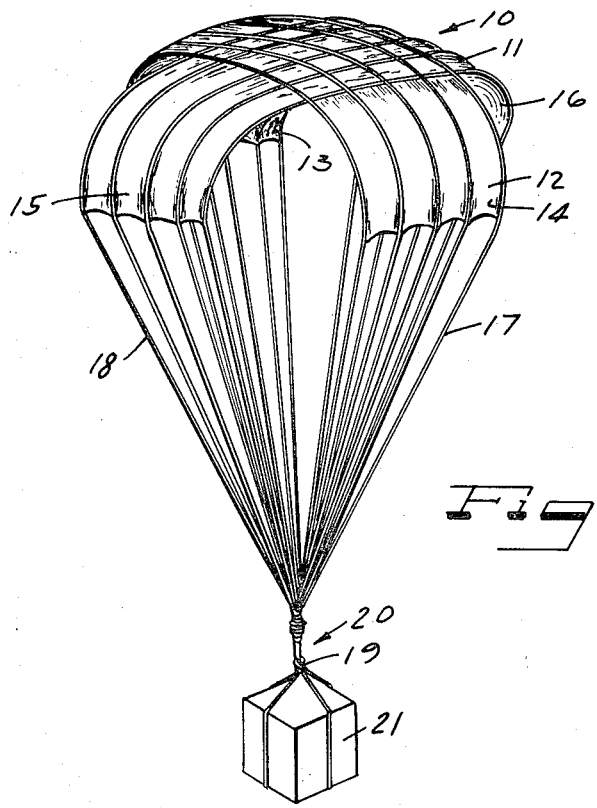
FIG. 1 illustrates a parachute according to the prior art.

FIG. 1, for example, illustrates a parachute according to the prior art as described in U.S. Pat. No. 3,331,573, in which a parachute 10 comprises a pair of generally rectangular-shaped panels 11 and 12 which are oriented with respect to each other at substantially right angles. Shroud lines 18 are connected to the downwardly extending portions 15 and 16 of panel 11, and shroud lines 17 are connected to the downwardly extending portions 13 and 14 of the panel 12. A load 21 is attached to a carrying loop 19 that is connected by a fitting 20 to the lower ends of the shroud lines 17 and 18, as shown.

Figure 2:
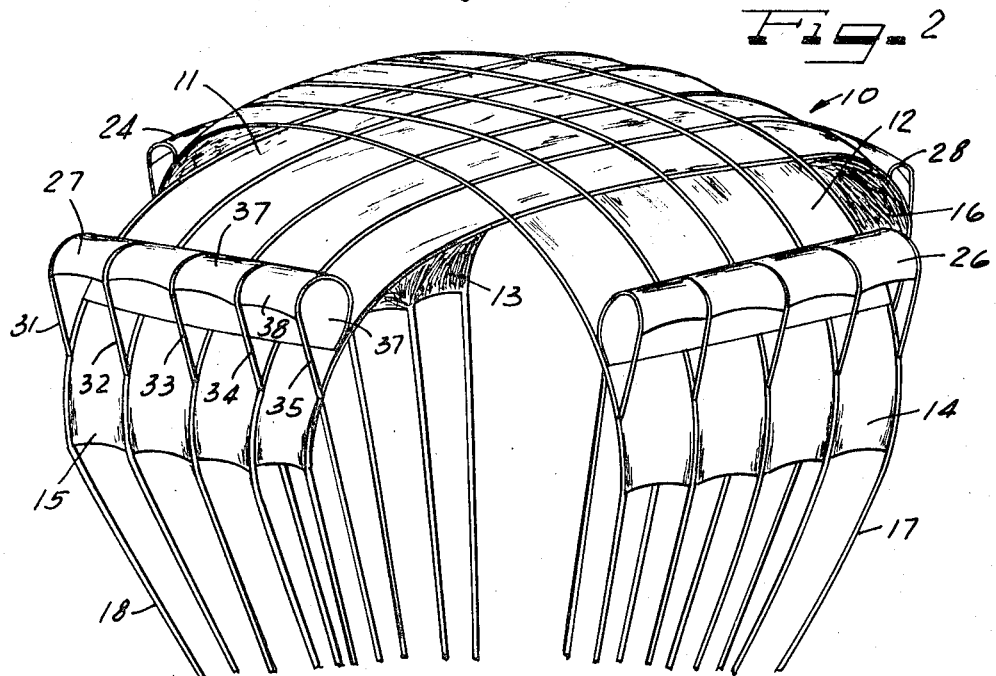
FIG. 2 illustrates a parachute of the present invention with the burble fence of this invention mounted thereon.

The improved parachute of this invention is illustrated in FIG. 2 wherein a burble fence is attached to each of the downwardly extending portions 13, 14, 15 and 16 of the panels 11 and 12 to cause an interruption of the air flow up over the parachute panels and thus provide a stable improved parachute. The burble fences are designated as 24, 26, 27 and 28, respectively, and comprise generally rectangular-shaped strips of parachute fabric to which are attached webbing strips 31, 32, 33, 34 and 35 so as to form generally upwardly extending portions of the burble fence designated generally as 36 and curved upward portions 37. Downwardly extending portions 38 of the burble fences are connected by ends of the webbings 31—35 back to the parachute panels.

FIG. 3 illustrates the burble fence 27 in the plan position and shows at that the strips 31—35 extend transversely of the strip 27 on either with the strips on one side labeled as 31a—35a, and the strips on the other side of the strip labeled as 31b—35, respectively. The center portions of the strips 31—35 are labeled as 31c—35c and are attached by sewing to the strip 27.

As shown in FIG. 2, the burble fence members 24, 26, 27 and 28 are attached to the panels 11 and 12 above the substantially vertical portion of the panels when inflated, and below the substantially horizontal portions of the panels when inflated. This assures that the flow of air up over the lower portions of the panels 11 and 12 will be smooth and the air flow will leave the panels at the burble fences 24, 26, 27 and 28 and result in a stabilized and improved parachute.

As shown in FIG. 2, the lower edges of the portions 38 of the strips are supported by the strips 31a—35a so that they are above the lower edges of the strips 27.

FIG. 4 illustrates a modification of the invention in which the burble fences are formed by generally rectangular panels 40, 41, 42 and 43 which have their lower edges 40a, 41a 42a and 43a attached to the panels 11 and 12 at a location similar to the attaching point of the burble fences illustrated in FIG. 2. It will be observed that the air flow will pass over the substantially vertical portions of the parachute panels 11 and 12 and the outer sides of the burble fences 40—43 and separate from the parachute. The upper edges 40b, 41b, 42b and 43b are the edges at which the smooth flow of air separates from the parachute and the separation point does not vary as the parachute descends and oscillation of the parachute does not occur.

FIG. 5 illustrates the conventional hemispherical parachute which comprises a supporting canopy 46 with shroud line 47 to which a suitable cargo 48 is attached. A burble fence 51 is attached about the outer surface of the canopy 46 between the substantially vertical portion when inflated, and the substantially horizontal portion when inflated, of the canopy. The burble fence may be of the form shown in FIGS. 2 and 3 or of the form illustrated in FIG. 4. Since the canopy 46 is hemispherical, the burble fence will be continuous about the periphery of the canopy.

Although the burble fence has been illustrated as being constructed of flexible material such as fabric, it is to be realized that it could be made of a rigid or semirigid material, if desired.

It is seen that this invention provides an improved parachute of increased stability.

Although minor modifications might be suggested by those versed in the art, it should be understood that I wish to embody within the scope of the patent warranted hereon all such modifications as reasonably and properly come within the scope of my contribution to the art.

I claim:

1. An improved parachute comprising: a canopy with downwardly extending shroud lines to which a cargo may be attached, said canopy when fully inflated having a substantially vertical lower portion and a substantially horizontal upper portion which are joined by a curved transition portion, the surface of the canopy being continuous from the vertical to the horizontal portions, a burble fence attached to and extending upwardly from the outer surface of said canopy on said curved transition portion at a position to obtain stability such that when the canopy is fully inflated air flow will pass over the substantially vertical lower portion, that portion of the curved transition portion below the burble fence, and, separate at all times from the canopy at the same location which is at the burble fence so that stability will be obtained from said parachute.

2. An improved parachute according to claim 1 wherein said burble fence comprises a strip with its lower edge attached to the periphery of the canopy.

3. An improved parachute according to claim 2 wherein the upper edge of said strip is free and extends generally upwardly.

4. An improved parachute according to claim 2 wherein holding means are attached to the upper edge of said strip to form the strip into a generally inverted J-shape in section.

5. An improved parachute according to claim 4 wherein said holding means comprise flexible straps which extend from the upper edge of said strip down to the canopy and are attached thereto.

6. An improved parachute according to claim 2 wherein said strip has a width which is sufficient to cause air flowing up over the canopy to separate therefrom at the burble fence.

7. An improved parachute according to claim 2 wherein said strip is formed of flexible material.

8. An improved parachute according to claim 2 wherein said strip is formed of rigid material.

9. An improved parachute according to claim 1 wherein said canopy is formed of two generally rectangular panels attached together so that they extend at right angles to each other, and said burble fence comprises four portions attached, respectively, to downwardly extending portions of said panels.

10. An improved parachute according to claim 9 wherein said four portions comprise rectangular strips.

11. An improved parachute according to claim 10 wherein the upper edges of said strip are free.

12. An improved parachute according to claim 10 wherein the upper edges of said strips are formed into an inverted J-shape.

13. An improved parachute according to claim 12 wherein holding means extend from the upper edges of said strips to the downwardly extending portions of said panels.